May 31, 1938.   G. H. SMITH ET AL   2,119,473
PRESSURE REGULATING AND REDUCING APPARATUS
Filed March 2, 1933   2 Sheets-Sheet 2
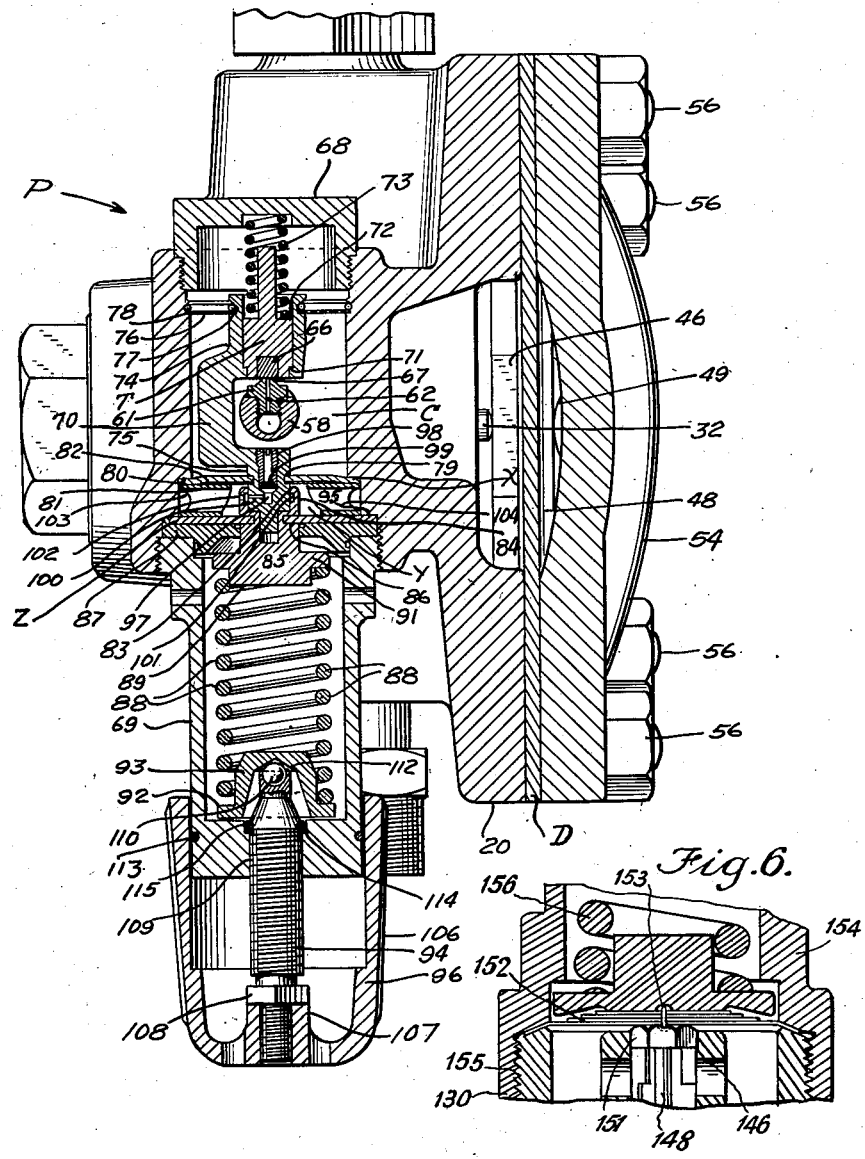
INVENTOR
GEORGE H. SMITH
WILGOT J. JACOBSSON.
BY
ATTORNEY Patented May 31, 1938

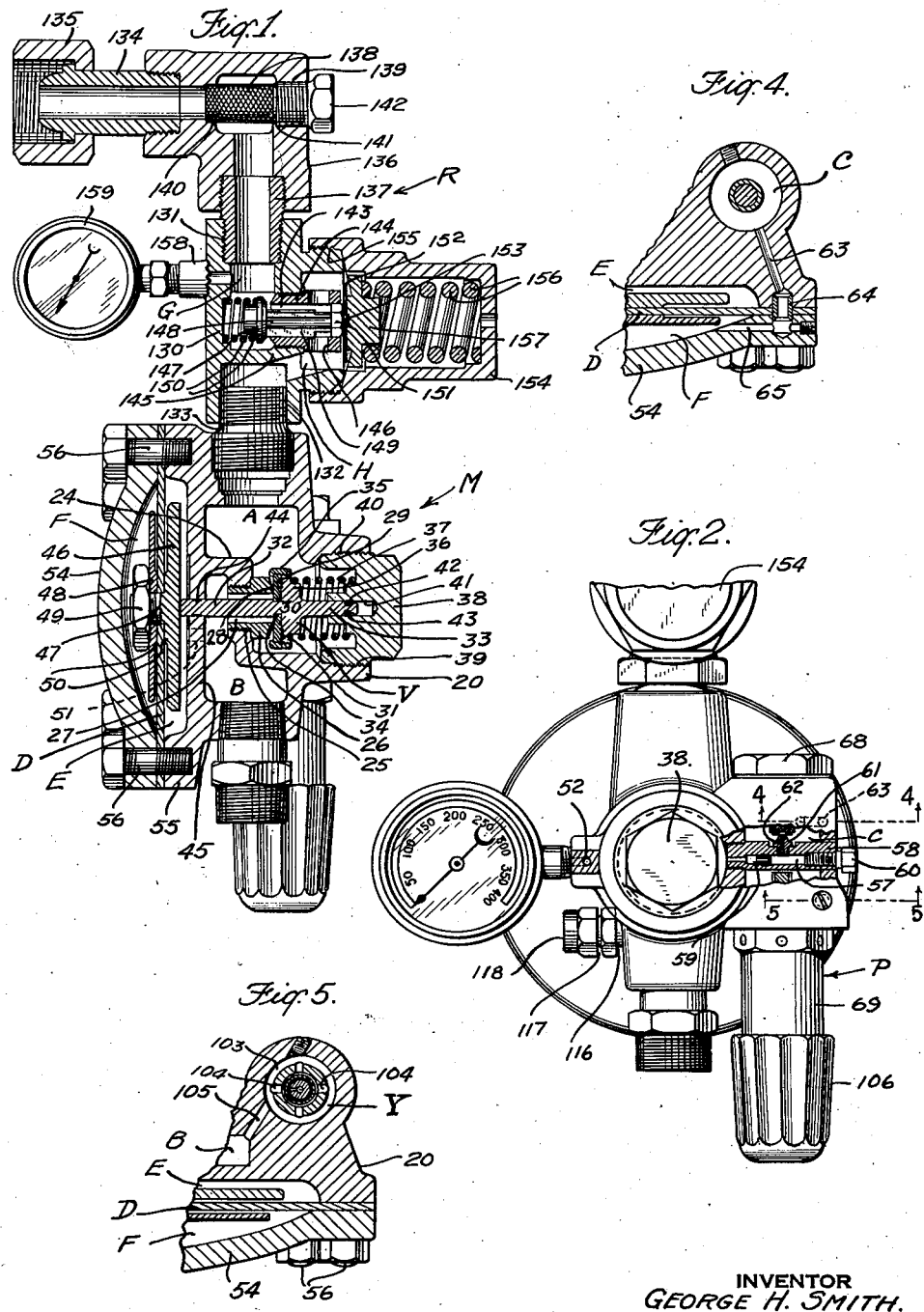

2,119,473

UNITED STATES PATENT OFFICE

2,119,473

PRESSURE REGULATING AND REDUCING APPARATUS

George H. Smith, Kenmore, and Wilgot J. Jacobsson, Buffalo, N. Y., assignors, by mesne assignments, to Union Carbide and Carbon Corporation, a corporation of New York Application March 2, 1933, Serial No. 659,318

8 Claims. (Cl. 50—11)

This invention relates to pressure regulating and reducing apparatus and more particularly to the combination of an improved pilot-controlled regulator and a pressure breaker for reducing relatively high fluid pressures to substantially constant low pressures.

Such improved pilot-controlled apparatus is particularly adaptable for use in reducing high pressures which are employed in welding and cutting operations where the initial pressures may be as high as 2000 to 3000 pounds per square inch. Prior regulators of the pilot-controlled type have not been capable of handling these high pressures, because the light weight of the balanced valve parts rendered the regulators unsafe and also because the refrigerating effect of the gases on being reduced in pressure tended to bring about the formation of pellets of ice which clogged the valve passages and nozzle openings when the high pressures were reduced to low working pressures of about 20 to 50 pounds per square inch.

An object of this invention is to provide a pressure regulating and reducing apparatus having means for preliminarily reducing the pressure in order to protect the light valve parts of a pilot controlling mechanism to regulate and deliver fluid at a substantially constant pressure.

Another object of this invention is to construct a pressure regulating and reducing apparatus comprising the combination of a pressure reducer adapted to reduce a high pressure to a substantially lower and more constant pressure and a pilot controlled regulator adapted to eliminate fluctuations in the main delivery pressure resulting from the fluctuating inlet pressures thereby to obtain substantially constant final delivery pressure.

The above objects together with the novel features of this invention will be apparent from the following description and from the accompanying drawings, of which Fig. 1 is a cross-sectional view showing the major valves and passages of the apparatus embodying this invention;

Fig. 2 is an elevational view partly in section of the pilot regulator disclosing a passage leading to the pilot valve;

Fig. 3 is a sectional view of the pilot valve and pressure responsive mechanism;

Fig. 4 is a fragmentary view of a section taken on the line 4—4 of Fig. 2 disclosing a passage leading to the main valve diaphragm chamber;

Fig. 5 is a fragmentary view of a section taken on the line 5—5 of Fig. 2 disclosing a passage leading to the outlet chamber of the apparatus; and Fig. 6 is a fragmentary enlarged sectional view showing the diaphragm structure of the pressure-breaker (R) according to the invention.

The pressure regulating and reducing apparatus comprises a pilot-controlled regulator, having a main regulator M and a pilot regulator P, each of the latter two being separately arranged in series with a pressure breaker R which delivers fluid at a greatly reduced pressure to the inlet of the main regulator M. The regulators M and P are of relatively light construction and capable of reducing the delivery pressure of the pressure breaker R to any desired working pressure. As an example, the pressure breaker R may deliver pressure at 350 pounds per square inch and the main regulator M reduces this pressure to the pressures employed in blowpipes.

The main regulator and the pilot regulator have valves and operating diaphragms connected therewith. The pilot valve is constructed to open in a manner opposed to that of the main valve so that a compensating pressure may be delivered from the pilot valve to operate the main regulator diaphragm. It is preferred to have the pilot valve open with inlet pressure so that the pilot delivery pressure falls with a falling fluctuation of pressure delivered by the pressure breaker R. When the pilot valve opens with the inlet pressure the main valve opens against inlet pressure so that the effect of a falling pressure delivered by the pressure breaker R tends to produce a rise in pressure through the regulator M. The tendency of the main valve to deliver a rising pressure in counteracted by the pressure delivered to the main diaphragm by the pilot valve, and a constant pressure thus is produced by the main valve. In order to make the counteracting effect of the pilot delivery pressure fully compensating, the pilot valve and the main valve are constructed to seat on valve sealing areas that are proportioned to one another substantially as the effective areas of the main diaphragm and the operating diaphragm in the pilot valve.

Referring to the drawings, a main regulator M is shown in Fig. 1 as assembled within a body 20 and a pilot regulator P which controls the main regulator is shown in Figs. 2 and 3. The body 20 may comprise a unitary casting having a compartment for the operating mechanism for each of the regulators.

The main regulator M has an inlet chamber A in the body 20 of the apparatus which is adapted to be connected to a source of fluid pressure through a conduit or nipple leading to the apparatus. The main regulator is provided with an outlet or delivery pressure chamber B which is separated from the inlet chamber A by a partition 24. The partition 24 has a bore 25 therethrough into which a nozzle 26 is threaded. The nozzle 26 has a port 27 which extends from the inlet A to the outlet B of the regulator M. The entrance to the nozzle port 27 is provided with a convex valve seat 28 adapted to insure a relatively narrow line of contact or sealing surface between the nozzle 26 and a valve disc 29 on the head 30 of a valve V which controls the port 27. The valve disc may be made of a suitable composition material held in close engagement with the metal of the valve head 30, and bearing against sharp annular ridges 31 made on the surface of the head 30 by cutting V shaped annular grooves in the surface. The edges 31 give a minimum contacting area between the disc 29 and the head 30 so that gas is prevented from leaking behind the disc and through the port opening 27. The valve V is provided with a valve operating stem 32 extending from the side of the valve head 30, adjacent to the nozzle 26 and a guiding stem 33 extending from the opposite side of the valve head 30.

The valve operating stem 32 is provided with a groove 34 for gripping the edges of a central hole in the valve disc 29. The outer edge of the head 30 is threaded to receive a disc retaining ring 35 which has an annular lip bearing against the outer edge of the valve disc for holding it firmly against the head of the valve V. The side of the head 30 of the valve V facing away from the nozzle has a hub 36 projecting within and guiding a helical spring 37 which is compressed between the valve V and a cap 38. The spring 37 is preferably of low compressive strength, having a low spring constant. The term spring constant as used herein means the force required to deflect the spring a unit distance. When the cap 38 is tightly screwed into the wall of the body 20 by means of engaging threads 39, 40 on the body 20 and the cap 38, the spring 37 tends to keep the valve V in its closed position. A bore 41 in the cap allows the guiding stem 33 of the main valve to slide therein as the main valve V moves to control the opening of port 27. Near the end of the stem 33 a groove 42 may be provided for a friction ring 43. The ring 43 is split so that it expands radially against the walls of the bore 41 in the cap 38 and the ring is also bent on a line across a diameter so that it fits closely within groove 42 and yet is free to turn about the valve stem. Chattering of the main regulator valve is substantially prevented by the small amount of friction produced by the ring 43 which slides frictionally in the bore 41.

A bore 44 is made in the wall 45 of the outlet chamber B in alignment with the valve port 27 and the bore 41 in the valve guiding cap 38. The operating stem 32 of the main valve V extends through the bore 44 and into an outlet or delivery pressure controlled chamber E formed between the walls of a depression in the body 20 of the apparatus and a main diaphragm D, which is adapted to operate the valve operating stem 32. The operating force is transmitted to the valve stem 32 through a diaphragm supporting plate 46 which contacts with the end of the valve stem 32. The supporting plate is clamped to the diaphragm D by means of a stud 47 which extends through a central opening of the diaphragm. The stud 47 passes through another plate 48 on the opposite side of the diaphragm which is urged towards the first supporting plate 46 by a nut 49 on the stud 47. The main diaphragm D is thereby clamped securely between central bosses 50 on the respective plates 46, 48 and leakage of fluid through the central opening in the diaphragm is thereby prevented.

A bore 51 is made in the wall 45 between the outlet chamber B and the outlet controlled chamber E to provide a freely communicating passage between the chambers. As disclosed in Fig. 2 a bore 52 in prolongation of the one between the chambers is made in the body 20 to which a pressure gauge is attached for indicating the outlet or main regulator delivery pressure.

A pilot controlled pressure chamber F is formed on the opposite side of the main diaphragm D from the outlet controlled pressure chamber E. The pilot controlled chamber F is formed between the main diaphragm D and a curved cover plate 54. The diaphragm D is clamped between the outer periphery of the cover plate 54 and a lip 55 on the body 20 by means of bolts 56 which pass through the cover plate 54 and which are threaded into the lip 55. The main diaphragm D when so positioned has an area exposed to the pilot controlled chamber F and an area exposed to the outlet controlled chamber E, and the differential of pressures acting upon the respective areas controls the position of the main valve V in respect to its valve seat 28 as will be more fully explained.

Fluid is supplied to the pilot controlled chamber F in the main regulator M by means of passages leading from the main regulator inlet chamber A to the pilot controlled chamber F. The passage of the fluid through the passages and the pressure of the fluid delivered to the chamber F is controlled by the pilot regulator P. The fluid on its passage from the inlet chamber A to the pilot controlled chamber F flows through a passage 57 in a nipple 58 which is screwed into a bore in the wall of the inlet chamber A. The nipple 58 passes through the pilot primary delivery chamber C and the opposite end of the nipple 58 is soldered or otherwise sealed in a bore in the opposite wall of the chamber C. The passage 57 in the nipple 58 is provided with a screen retainer 59 having a screen over the passage therethrough. The outer end of the passage 57 in the nipple 58 is closed with a plug 60. A nozzle 61 is secured to the nipple 58 and it is provided with a passage 62 for conducting the fluid from the nipple 58 to the pilot primary delivery chamber C. As shown in Fig. 4 the fluid then flows from the primary delivery chamber C to the pilot controlled chamber F through a passage 63 formed in the wall of the body 20, a nipple 64 inserted in a bore in the diaphragm D and a passage 65 in the cover 54 of the pilot controlled chamber F.

A pressure controlled pilot valve T is provided with a valve disc 66 which cooperates with a narrow valve seat 67 around the discharge end of the passage in the pilot valve nozzle 61 for controlling the passage of the gas therethrough. The mechanism for operating the pilot valve T is enclosed in the space between a closure cap 68 for one end of the chamber C and a diaphragm retaining and spring cap 69, one of which is screwed into an extension of each end of the chamber C. The pilot valve T may be of cylindrical shape fitting slidably within a valve stem or yoke 70 and may have a stop shoulder 71 cooperating with a similar shoulder on the yoke so that the yoke may move the disc 66 away from the nozzle 61. The valve T is further provided with a shoulder 72 against which a light valve-closing spring 73 is compressed, the fixed end of the spring being supported by a small recess in the cap 68.

The yoke 70 is U-shaped and has a valve disc guiding portion 74 at one end and a diaphragm-supporting portion 75 at the other end. The two end portions of the yoke 70 are in alignment with the nozzle 61 and are positioned on opposite sides of the nipple 58. When centrally positioned in the chamber C the upper end of the yoke is guided by an annular perforated metal disc 76 held at the inner periphery thereof by a shoulder on the yoke 70 and at the outer periphery by a shoulder in the wall of the chamber C. Wire clamping rings 77, 78 keep the disk flexibly positioned against the respective shoulders. The diaphragm-supporting end 75 of the yoke 70 passes through a central opening in a primary diaphragm X which closes the lower end of the pilot primary delivery chamber C. The edge of the opening in the diaphragm X fits into a groove 79 in the yoke and forms a fluid tight seat therewith. The outside edge of the diaphragm X is clamped between a shoulder 80 in an extension of the wall of the chamber C and an annular spacer 81 having a central opening or secondary delivery chamber Y therein to receive the diaphragm supporting end 75 of the yoke 70. In order to strengthen the diaphragm X a thin flexible metal disc 82 of smaller diameter than the chamber C and fitting loosely around the lower end 75 of the yoke 70 is inserted between the spacer 81 and the diaphragm X.

The diaphragm supporting end 75 of the yoke 70 slidably fits into a bore 83 in the stem 84 of a diaphragm supporting and guiding washer 85 and may be supported by the bottom of the bore. The stem 84 of the washer 85 passes through a central opening in a secondary diaphragm Z which closes the lower end of the secondary delivery chamber Y formed in the central opening of the spacer 81 between the primary and secondary diaphragms X, Z. A groove 86 is formed in the stem of the washer 85 and the edge of the central opening in the secondary diaphragm Z fits into the groove and thereby forms a fluid tight seal between the diaphragm Z and the stem 84. The secondary diaphragm Z is received in a recess in a diaphragm supporting and guiding disc 87 having a central opening therein through which the stem 84 of washer 85 is inserted before the secondary diaphragm Z is placed thereon.

It should be noted at this point that the central opening in the diaphragm spacer 81 is smaller at the end adjacent to the primary diaphragm X than it is at the end adjacent to the secondary diaphragm Z and as a result the effective area of the bottom of the primary diaphragm which is exposed to the opening or secondary delivery chamber Y is less than the effective area of the secondary diaphragm Z which is exposed to the same chamber. Therefore any fluid pressure which may be transmitted to the secondary delivery chamber Y will exert a preponderance of force on the secondary diaphragm, which force acts additively with the force exerted by the fluid pressure in the primary delivery chamber C on top of the primary diaphragm X. The combination of these forces acts unitarily through the diaphragm guiding washer 85 to overcome the force of an adjusting spring 88 acting in compression against the head 89 of the washer 85 and will thereby permit the pilot valve closing spring 73 to move the pilot valve T from its open position to its closed position. Both the primary and secondary diaphragms are made of very flexible materials such as rubber. For reasons to be further explained the apparatus is so constructed that when it is in operation under fluid pressure, the pressure per square inch on top of the primary diaphragm is never less than the pressure per square inch on the bottom of the primary diaphragm. Also when fluid is being admitted through the open pilot valve port 62 the pressure per square inch in the primary diaphragm chamber C is greater than the pressure in the secondary diaphragm chamber Y. For these reasons that portion of the primary diaphragm X lying on the spacer 81 between the central opening Y and the walls of the primary delivery chamber C will always be forced in contact with the entire top surface of the spacer 81 and a constant effective area of the bottom of the primary diaphragm will be exposed to the secondary diaphragm chamber Y during the operation of the apparatus under pressure.

The head 89 of the diaphragm supporting washer 85 is provided with a hub which fits into one end of the adjustable coil spring 88. The hub centers and retains the spring 88 on the head 89 of the washer 85. The spring 88 is normally compressed between an annular shoulder 91 on the diaphragm guiding washer head 89 and a shoulder 92 on a cup-shaped washer 93 supported by the end of an adjusting screw 94 which cooperates with threads in a bore in the lower end of the spring cap 69. The spring cap 69 is screwed into the bottom end of the extension of the chamber C. The inner end of the spring cap 69 is screwed up against the secondary diaphragm supporting disc 87 and clamps the disc and the secondary diaphragm Z between the end of the spring cap 69 and a shoulder 95 in the walls of the lower extension of the chamber C. When the chamber closure cap 68 and the spring cap 69 are in place, the pilot valve mechanism is maintained in its operating position and it may be manually adjusted by screwing the adjusting screw 94 in or out by means of a screw handle 96. When the pilot adjusting screw 94 is set to operate the main regulator M, the compressive force of the adjusting spring 88 and the inlet pressure acting on the pilot valve T maintains it in an open position, except when the composite pressure on the pilot primary and secondary diaphragms is high enough to close the valve as shown in Figs. 2 and 3.

Fluid may flow from the primary delivery chamber C to the secondary delivery chamber Y through a constricted bleeder passage 97 in the pilot valve yoke 70. A plug 98 having a screen 99 secured in its end is screwed into the inlet to the bleeder passage 97. The discharge end 100 of the bleeder passage in the yoke 70 is reduced in size to provide the constriction therein. It is drilled at right angles to the inlet to the passage, and it discharges into an annular groove 101 within the bore 83 in the diaphragm guiding washer 85, within which the diaphragm supporting end 75 of the yoke 70 is slidably fitted. The groove 101 in the washer 85 is made sufficiently wide to obtain communication between the bleeder passage 97 and the chamber Y. A tap hole 102 extends through the wall of the washer stem 84 into the groove 101 to conduct fluid from the groove 101 into the secondary delivery chamber Y.

The spacer 81 which separates the pilot primary and secondary diaphragms X, Z has a circumferential groove 103 formed in its outer periphery which is connected to the secondary delivery chamber Y by means of a plurality of radial passages 104 formed in the spacer 81. The chamber formed between the walls of the groove 103 in the spacer and the walls of the recess which retains the spacer is connected with the main regulator delivery chamber B by a passage 105 in the body 20 of the apparatus as shown in Fig. 5. The latter passage 105 completes the connecting link between the pilot controlled main diaphragm chamber F and the delivery chamber B through the pilot primary and secondary delivery chambers C, Y.

It will be noted that the connections between the pilot primary delivery chamber C and the pilot controlled main diaphragm chamber F have no effective constrictions and in like manner the connections between the pilot secondary delivery chamber Y and the main regulator delivery chamber B have no effective constrictions, but there is a constriction 100 between the pilot primary diaphragm chamber C and the pilot secondary diaphragm chamber Y. Due to the non-constricted passages substantially the same pressure is maintained in the primary diaphragm chamber C and the pilot controlled main diaphragm chamber F, and substantially the same pressure is maintained in the secondary diaphragm chamber Y and the delivery pressure controlled main diaphragm chamber E, but due to the constriction 100 in the bleeder passage 97 a differential of pressure may be maintained between the primary and secondary delivery chambers C, Y. This differential of pressure is herein called an intermediate pressure. The pressure in the two chambers C, Y tends to become slowly equalized at all times through the passage of fluid through the bleeder passage 97, and it does become equalized under certain conditions to be referred to hereinafter.

A novel spring adjusting assembly is employed for varying the compression of the spring 88. The assembly comprises a cup-shaped handle 96 having a cylindrical opening which allows the handle to be slidably moved in relation to the outside of the cap 69. The handle may be provided with a number of corrugations or slightly raised ribs 106 which serve to insure a good gripping surface for manual operation. A stud 107 arranged centrally inside the base of the handle may be drilled and tapped to receive the adjusting stem 94. In order to prevent the handle from becoming unscrewed from the stem, a hexagonal shoulder 108 is provided a relatively short distance from the lower end of the stem. A socket wrench may be slipped over the shoulder 108, and the stem 94 may be tightened securely in the stud 107 to which it is preferably soldered. The stem cooperates with a threaded opening 109 in the end of the cap 69 so that by turning the handle an adjustment may be made in the position of the stem relative to the end of the spring. At the end of the stem a recess is provided for receiving a ball bearing 110 which may serve to center the force of the stem against the center of a conical socket 112 in the adjusting washer 93. A groove may be made near the end of the cap and a spring wire ring 113 fitted into the groove in order to create friction and to prevent the handle 96 from moving from set positions and causing changes in the delivery pressure for which the apparatus is regulated. When the handle 106 and stem are screwed into place a thin washer 114 is slipped over the upper end of the stem and forced to the base of the threaded portion where a groove is made for retaining a wire ring 115. The ring 115 and washer 114 prevent the stem from being screwed out of the cap when the spring is decompressed.

An outlet 116 may be made in the wall of the body 20 leading from the outlet chamber B. A nipple 117 is threadedly secured in the outlet 116 and provided with a frangible disc 118 which disc is made of material suitable to withstand pressures ordinarily delivered by the regulator, but which will fracture when the pressure exceeds a given amount. The disc 118 acts as a safety device to protect the pilot regulator in the event of the failure of the pilot controlled regulator valve seats or nozzles.

In accordance with this invention a pressure breaker R is employed immediately ahead of the inlet of the main regulator M and is attached thereto. The pressure breaker may comprise a body 130 having an inlet 131 and an outlet 132 which may be connected with the inlet of the pilot controlled regulator M by a nipple 133. The inlet of the pressure breaker is provided with a connecting nipple 134 and nut 135 and a screen retainer 136. The nut 135 is rotatably held against a flange on the cooperating nipple 134 so that a tight joint may be made with a source of high pressure fluid supply. In order to remove foreign particles from the fluid, an elbow fitting or screen retainer 136 may be employed ahead of the pressure breaker, being threadedly joined with the nipple 134 and with a nipple 137 connecting with the inlet 131 of the pressure breaker R. A fine mesh wire screen 138 of cylindrical shape may be inserted in the retainer 136 through an opening 139. The inner end of the screen is arranged to fit within a shoulder 140 in the passage of the retainer so that the fluid will flow inside the cylindrical screen and be filtered as it passes to the nipple 137. When the screen is placed in position, an annular ring 141 having a lip fitting inside the outer end of the screen cooperates with a suitable screw plug 142 tightly to secure the screen within the retainer.

The inlet 131 opens into a chamber G in the body 130 and is connected by a port 143 with an outlet chamber H. The port 143 comprises the central bore of a nozzle 144 which is threadedly held in a partition 145 in the body, the partition separating the chamber G from the outlet chamber H. The nozzle has a shoulder extending into the outlet chamber and is provided with a number of radial apertures 146 which permit the passage of fluid. When the nozzle 144 is screwed into position it also extends into the chamber G and provides a seating area for a valve head 147, which head is threaded to a stem 148 passing through the port 143 and arranged centrally therein by means of radially extending vanes 149 slidably contacting the wall of the bore in the nozzle 144. Adjacent the apertures 146, segments of the vanes 149 are cut away to allow the fluid to pass readily from the port into the outlet chamber H. The valve head 147 may have an annular seating portion which cooperates with the seating area of the nozzle 144 in closing the port. A reduced section of the valve head 147 behind the valve face is arranged to fit within a coil spring 150 which is compressed between the shoulder of the valve head and a recessed area in the body and exerts a slight force tending to close the valve. The end of the valve stem 148 may be provided with a hexagonal shoulder 151 fitting slidably within the bore of the nozzle and abutting against the central area of a valve operating diaphragm 152.

The diaphragm 152 is made up of a plurality of superposed discs of successively smaller diameter toward the side opposed to the valve stem. When clamped together by a bolt or rivet 153 at the center, the diaphragm may be arranged to cover the chamber H and to be held at the outer edge by a cap 154 having a beveled shoulder cooperating with a threaded lip 155 on the body 130. The bolt 153 is soldered at the ends so that the leaves of the diaphragm are firmly held together, and recesses are provided in the shoulder 151 and in a floating supporting plate 157 for receiving the soldered ends of the bolt and to serve in aligning the diaphragm 152 centrally in the body of the pressure breaker. A strong coil spring 156 and the plate 157 are arranged in the cap 154 so that the spring is compressed between the plate and the end of the cap when the cap is screwed against the lip 155 on the body. It is preferred to predetermine the amount of compression of the spring so that the reduction of pressure resulting from the force exerted against the diaphragm 152 will be a relatively constant amount. The plate 157 has a face adjacent the diaphragm which is beveled from the outer edge for substantially one half the radius of the plate. The angle of bevel is slight, being between 5° and 10° so that the outer margin of the smaller discs of the diaphragm 152 will be compressed only lightly by the plate, whereas the center of the discs will be tightly held between the raised center portion of the plate 157 and the valve stem 148. This arrangement of the discs permits a flexing action to occur when pressure within the chamber H acts to compress the spring within the cap and eliminates wear in the diaphragm. When the diaphragm 152 moves away from the valve stem 148 under pressure of fluid delivered through the nozzle 144, the pressure in the inlet chamber G and the force of the small spring 150 tend to close the valve head 147 against the seating area on the nozzle 144. The movement of the plate 157 and diaphragm 152 is limited to a relatively short distance of travel by a stop shoulder on the inside of the cap 154 and by the end of the nozzle 144 so that excessive strain is prevented from bursting the diaphragm.

The inlet chamber G is provided with a suitable nipple outlet 158 extending from the side of the body and provided with threads for connecting a pressure gauge 159 which indicates the pressure of fluid admitted from the inlet of the pressure breaker.

In practice the pressure regulating and reducing apparatus operates as follows: Fluid from a source of supply such as a high pressure manifold enters the nipple 134 and is filtered by the screen 138 in passing to the chamber G. The valve in the pressure breaker R is normally in an open position under pressure of the spring 156 so that the fluid will flow through the valve port 143 to the chamber H. As the fluid passes the relatively small opening between the valve head 147 and the seat on the nozzle 144 its pressure is greatly reduced, the amount of reduction depending upon the size of the opening. In the chamber H the fluid acts against the multi-disc diaphragm 152, compressing the spring 156 within the cap 154 until the spring and pressure forces adjust the position of the valve to deliver a relatively constant pressure. Decreases in the pressure in the chamber H permit the spring to elongate and force the pressure breaker valve to a wider position so as to make up for the deficiency in the pressure passing to the inlet of the pilot controlled regulator M.

The pressure breaker R reduces the pressure to a value that can be further reduced and regulated in the pilot controlled regulator M. Wide changes in the pressure of the inlet gas are substantially eliminated by the pressure breaker, but the pressures delivered by the breaker although many times reduced are only relatively constant. By passing the gas which has been well reduced in pressure to a pilot controlled regulator, final absolute control may be exercised over the pressures and volumes which it is desired to deliver.

By screwing in the adjusting handle 96 the pilot valve T is lifted from its normally closed position and fluid begins to flow into the pilot valve compartment and the chamber C. Pressure builds up in the chamber C and under the cover 54 of the main regulator until sufficient force is exerted against the diaphragm D to open the main valve V. A small amount of fluid which flows through the bleeder passage 97 and the tap hole 102 into the opening Y in the spacer 81 joins the greater volume passing through the main valve port 21 to the outlet chamber B. When the outlet of the main regulator is closed off, as by a throttle valve in the handle of a blowpipe or other valve means, the pressure tends to equalize in the outlet chamber and in the chamber C as well as in the chambers E, F on either side of the main diaphragm D. The pilot valve T closes when the pressure in chamber C acting on the diaphragm X overcomes the force of the adjusting spring, and since the main valve V is closed by the equalizing of pressures acting on the diaphragm D, the pressure in the outlet chamber B is reduced and ready for delivery. On opening the throttle valve in the outlet, the apparatus operates to open the pilot valve T and the main valve V until a balance of spring and pressure forces is reached. When operating, there is constantly a differential between the pressure in the chamber C and the pressure at the outlet so that the main valve V remains in an open position as long as fluid is being consumed.

Fluctuations in the pressure in the chamber A are not transmitted to the pressure delivered at the outlet. As an example, a fall of pressure in the chamber A will cause a slight fall of pressure in chamber C and in the space F over the main diaphragm which will tend to open the main valve wider and cause less reduction in the pressure passing the main valve. Since the valve closing areas and the diaphragms are proportioned similarly in the main valve and the pilot valve, the pressure drop in the fluid delivered by the pilot valve to the space F will be substantially the correct amount to offset any effect which the fall of pressure in the chamber A might have on the main valve delivery pressure.

In addition the diaphragm Z acts to adjust the apparatus for sudden changes in the rate of flow, which changes occur when different amounts of fluid are required at the blowpipes or other consuming equipment. As an example, when the valve means in the outlet is opened wider, an increase in the flow of fluid occurs, followed by a nearly simultaneous decrease in pressure. This decrease in pressure takes place in the chamber B and also in the opening Y of the spacer 81 as well as the space F under the main diaphragm. The effect of the drop of pressure in the opening Y of the spacer 81 is to decrease the force acting on the diaphragm Z with a consequent opening of the pilot valve T wider, and an increase of pressure delivered by the pilot valve. The main valve quickly responds to the decrease in pressure under the main diaphragm and the increase in pressure over the diaphragm so that the outlet pressure is quickly increased to the originally desired value and a greater volume of fluid is delivered to the outlet.

We claim:

1. In a fluid control valve having a valve head, a grooved cap, and a spring within the cap for adjusting the position of the valve head the combination of a handle comprising a stem threadedly operable through the end of the cap; a cup-shaped shell secured to said stem and fitting loosely over the end of the cap; and means associated with the groove in the cap to serve to create friction between the shell and the cap when the handle is moved to change the compression of the spring.

2. In a fluid control valve the combination of a valve body; a cap secured to said body and having a threaded opening in the end thereof; a valve head; a spring enclosed in the cap and being compressed against the valve head; a socket plate fitting within the end of the spring; a stem extending through the end of the cap and having threads thereon cooperating with the threaded opening in the cap; a cup-shaped member attached to the stem and fitting over the end of the cap; and means exerting a yieldable friction between the cap and said member for holding the cap in adjusted position.

3. In a fluid control valve, the combination of a valve body; a cap secured to said body, the cap having a threaded opening in the end thereof, an internal annular groove surrounding the threaded opening, an annular groove on the exterior of the cap; yieldable friction rings respectively in each of said grooves; a valve-operating member; a spring enclosed in the cap and adapted to be compressed against the valve-operating member; means for compressing said spring including a stem operable in the said opening of the cap and adapted to frictionally engage the ring in the second-named groove, and a cup-shaped member attached to the said stem and adapted frictionally to engage the ring in the first-named groove.

4. In a fluid control device having a valve adapted to contact with a valve seat therein, the combination comprising; a diaphragm in operative connection with said valve, said diaphragm being made of a plurality of superposed discs successively smaller in diameter in the direction toward the side thereof opposite the valve; a floating plate on the side of the diaphragm opposite the valve for controlling movement of said diaphragm, the face of said plate adjacent said diaphragm being undercut from its outer edge to a point within the perimeter of the smallest of said superposed discs whereby during operation the outer margins of the smaller discs are compressed but slightly so as to reduce diaphragm wear.

5. In a fluid control device having a valve adapted to contact with a valve seat therein, the combination comprising; a diaphragm in operative connection with said valve, said diaphragm being made of a plurality of superposed discs successively smaller in diameter in the direction toward the side thereof opposite the valve; a floating plate on the side of the diaphragm opposite the valve for controlling movement of said diaphragm, the face of said plate adjacent said diaphragm being undercut from its outer edge to a point within the perimeter of the smallest of said superposed discs whereby during operation the outer margins of the smaller discs are compressed but slightly so as to reduce diaphragm wear; and stop means for limiting the movement of the diaphragm in both directions under the influence of fluid pressure.

6. In a fluid control device having a valve adapted to contact with a valve seat therein, the combination comprising; a diaphragm in operative connection with said valve, said diaphragm being made of a plurality of superposed discs successively smaller in diameter in the direction toward the side thereof opposite the valve; a floating plate on the side of the diaphragm opposite the valve for controlling movement of said diaphragm; means securing the diaphragm discs together at their centers having a portion engaging a shallow recess in the valve head and having another portion engaging a shallow recess in said plate for maintaining axial alignment of said diaphragm, valve and plate.

7. In a fluid control device having a valve adapted to contact with a valve seat therein, the combination comprising; a diaphragm in operative connection with said valve, said diaphragm being made of a plurality of superposed discs successively smaller in diameter in the direction toward the side thereof opposite the valve; a floating plate on the side of the diaphragm opposite the valve for controlling movement of said diaphragm, the face of said plate adjacent said diaphragm being undercut from its outer edge to a point within the perimeter of the smallest of said superposed discs whereby during operation the outer margins of the smaller discs are compressed but slightly so as to reduce diaphragm wear; means securing the diaphragm discs together at their centers having a portion engaging a shallow recess in the valve head and having another portion engaging a shallow recess in said plate for maintaining axial alignment of said diaphragm, valve and plate.

8. A fluid control valve comprising a body having an inlet chamber and an outlet chamber; a nozzle mounted in the outlet chamber; an annular rim on the body forming a wall for the outlet chamber, said rim being beveled on the outer edge thereof; a cap secured to said annular rim and having a sloping shoulder cooperatively bearing against the beveled portion of the rim; a partition in the body separating the inlet chamber from the outlet chamber and being provided with a port opening; a valve head opening against inlet pressure and controlling said port opening and having a stem extending into the outlet chamber; means for aligning the valve head with the nozzle; a diaphragm supported between the annular rim of the body and the sloping shoulder of the cap so as to be normally curved, said diaphragm bearing against the stem of the valve head; a plate shaped at the margin thereof to conform with the contour of the diaphragm; and a spring compressed between the cap and the plate for thrusting the diaphragm against the stem of the valve.

GEORGE H. SMITH.
WILGOT J. JACOBSSON.